(12) United States Patent
Gosis et al.

(10) Patent No.: US 7,837,225 B2
(45) Date of Patent: Nov. 23, 2010

(54) AIRBAG FASTENER ASSEMBLY

(75) Inventors: Anatoly Gosis, Palatine, IL (US); Brock T. Cooley, Bloomer, WI (US); James T. Kirchen, Chippewa Falls, WI (US); Frank Otte, Mount Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 85 days.

(21) Appl. No.: 12/409,006

(22) Filed: Mar. 23, 2009

(65) Prior Publication Data
US 2009/0285648 A1 Nov. 19, 2009

Related U.S. Application Data

(60) Provisional application No. 61/053,171, filed on May 14, 2008.

(51) Int. Cl.
*B60R 21/21* (2006.01)
*F16B 13/04* (2006.01)

(52) U.S. Cl. .................. 280/730.2; 24/297; 24/458; 411/45; 411/175

(58) Field of Classification Search ............... 280/728.2, 280/730.2; 24/297, 453, 458
See application file for complete search history.

(56) References Cited

U.S. PATENT DOCUMENTS

| | | | | |
|---|---|---|---|---|
| 4,086,679 A | * | 5/1978 | Butler | .................. 16/4 |
| 4,830,556 A | * | 5/1989 | Nelson | ................. 411/41 |
| 5,163,795 A | * | 11/1992 | Benoit et al. | ............. 411/45 |
| 5,937,745 A | * | 8/1999 | Boe | ................. 100/2 |
| 6,053,458 A | | 4/2000 | Meyer | |
| 6,333,515 B1 | | 12/2001 | Kubota et al. | |
| 6,394,695 B1 | | 5/2002 | Chausset | |
| 6,431,585 B1 | * | 8/2002 | Rickabus et al. | ............. 280/728.3 |
| 6,504,101 B2 | * | 1/2003 | Kondoh | ................. 174/135 |
| 6,565,117 B2 | | 5/2003 | Kubota et al. | |
| 6,667,002 B1 | | 12/2003 | Meyer | |
| 6,752,576 B2 | | 6/2004 | Johansson et al. | |
| 7,077,449 B2 | | 7/2006 | Tokunaga | |
| 7,454,826 B2 | * | 11/2008 | Nessel et al. | .............. 29/453 |
| 7,484,919 B2 | * | 2/2009 | Hansen | ............... 411/45 |
| 7,698,788 B2 | * | 4/2010 | Hansen et al. | ............. 24/297 |

(Continued)

FOREIGN PATENT DOCUMENTS

JP 9315253 9/1997

(Continued)

OTHER PUBLICATIONS

International Search Report and Written Opinion for PCT/US2009/039251.

*Primary Examiner*—Paul N Dickson
*Assistant Examiner*—Joseph Rocca
(74) *Attorney, Agent, or Firm*—Mark W. Croll; Paul F. Donovan

(57) ABSTRACT

A fastener for securing an airbag assembly in a motor vehicle includes first and second body components held one against another with a fastening tab of an airbag there between. A flexible collet from the body of the fastener is secured in a hole of a supporting component in a vehicle roof, and a pin pushed into the collet secures the installation. Tools and fastener structures for verification testing are disclosed.

28 Claims, 9 Drawing Sheets

U.S. PATENT DOCUMENTS

| | | |
|---|---|---|
| 2005/0062263 A1 | 3/2005 | Kawai et al. |
| 2005/0285374 A1 | 12/2005 | Kawai et al. |
| 2006/0066080 A1 | 3/2006 | Ikeda et al. |
| 2006/0232048 A1 | 10/2006 | Schneeweiss et al. |

FOREIGN PATENT DOCUMENTS

| | | |
|---|---|---|
| JP | 3422299 | 4/2003 |
| WO | WO 2006/026956 | 3/2006 |
| WO | WO 2008/028646 | 3/2008 |

* cited by examiner

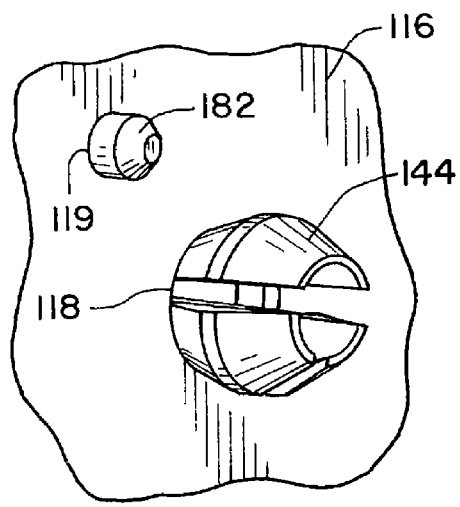
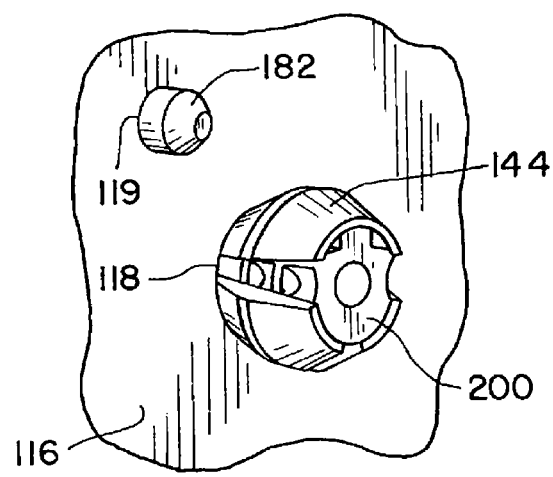
Fig. 10  Fig. 11
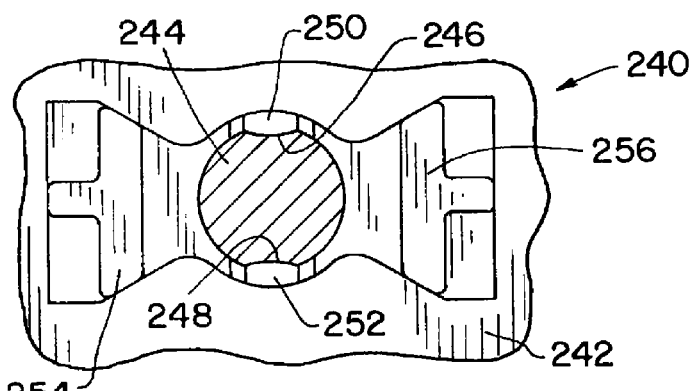
Fig. 12
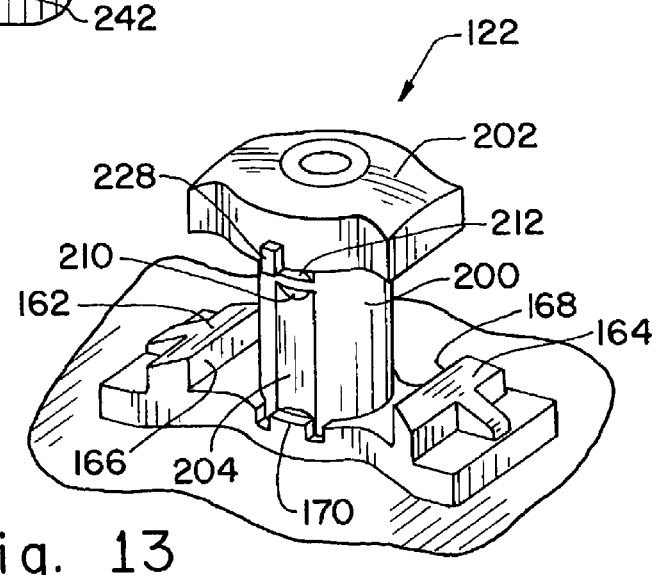
Fig. 13

AIRBAG FASTENER ASSEMBLY

CROSS-REFERENCE TO RELATED APPLICATIONS

The present application claims the benefits of U.S. Provisional Application Ser. No. 61/053,171 filed May 14, 2008.

FIELD OF THE INVENTION

The present invention relates to fasteners, and, more particularly, to fasteners for assemblies requiring quick, easy attachment, strong retention and feedback or verification of proper installation; and still more particularly the invention pertains to fastener assemblies for side curtain airbag installations in motor vehicles.

BACKGROUND OF THE INVENTION

Side curtain airbags have been added as an additional measure of passenger safety in automobiles. A side curtain airbag assembly is retained behind interior trim of the headliner, just above the vehicle side window. During a crash event, the airbag is deployed between the vehicle occupant and the window or other side structures of the vehicle.

A fastener for holding a side curtain airbag in place must be strong enough to retain the airbag assembly in place even during aggressive, rapid deployment of the air bag during a vehicle crash event. It is necessary also to retain a side curtain airbag assembly in a fixed position without rattling during vehicle operation. Desirably, the fastener can be inserted quickly and easily in a simple operation, yet has strong retention force. Still further desirable is a fastener assembly that is conducive to pre-assembly steps so that final installation of the airbag assembly can be performed quickly and efficiently.

A known fastener assembly for side curtain airbags includes a bolt and a weld nut of standard design. In addition to providing an opening by punching or stamping a frame-like member of the vehicle roof structure, it is necessary to position and secure, such as by welding, a nut in the correct location. This requires an additional manufacturing step for welding the nut in place, in addition to the subsequent securing steps for installing the airbag assembly in position. The assembly steps required for installing the airbag assembly can be time consuming and complex, including positioning the bag in the proper location and separately acquiring a bolt, inserting the bolt through the bag assembly, and rotating the bolt into the nut that was welded in place in the roof structure during a previous step. A fixation method of this type is robust, but can be expensive in materials and assembly costs. Further, it is necessary to fix a standard bolt in the tightened position so that vibrations during subsequent operation of the vehicle do not cause the bolt to work loose, backing out of the weld nut.

In some installation and assembly processes, it is desirable to acquire and record data documenting that all fasteners have been properly positioned, properly tightened and properly verified. In a standard bolt and nut attachment, some degree of verification can be achieved through visual inspection and by acquiring torque readings for the tightened fastener. However, an improperly inserted fastener can exhibit the expected high torque readings even when not properly tightened in place. Further, with a standard bolt there has been no satisfactory way of ensuring that the individual readings recorded for verification have each been acquired from different fasteners. Multiple readings can be acquired from a single fastener, either intentionally or inadvertently.

Issues such as those noted above and others have been present in the assembly and installation structures and processes for installing fastener assemblies used to attach side curtain airbags in automobiles. Accordingly, improvements in fastener assembly structures, installation processes and installation verification procedures are desirable and advantageous.

SUMMARY OF THE INVENTION

The present invention provides a fastener for side curtain airbag assemblies that can be preassembled onto the airbag assembly for subsequent final installation of the air bag in a simple, rapid step. Various designs for the fastener provide testing and verification procedures to ensure that the fastener is adequately and properly installed.

In one aspect of one form thereof, the present invention provides an airbag fastener assembly with a body having first and second body components foldable one against another for capturing a portion of an airbag assembly therebetween. A collet affixed to one of the body components extends through the other of the body components when the body components are folded together. A pin secures the collet in a vehicle.

In another aspect of another form thereof, the present invention provides an airbag assembly installation in an automobile having a roof component with a hole. The airbag assembly installation includes an airbag assembly including a fastening tab and an airbag connected to the fastening tab. A fastener assembly secures the airbag assembly to the automobile roof component. The fastener assembly includes a body having first and second body components foldable one against another with the fastening tab therebetween. A collet affixed to one of the body components extends through the other of the body components. The collet is secured in the hole of the roof component.

In a further aspect of a further form thereof, the present invention provides a fastener assembly with a body having first and second body components foldable one against another for capturing therebetween an article to be held by the fastener assembly. A flexible collet includes a plurality of collet segments affixed to one of the body components and extendable through the other of the body components when the body components are folded together. The collet has a waist of greatest girth and progressively narrow portions extend on either side of the waist. A pin in the collet inhibits inward flexion of the collet segments.

An advantage of the invention in at least one form thereof is providing a fastener for side curtain airbags that can be pre-assembled with all components on the airbag assembly and subsequently installed in a vehicle in an easy assembly process.

Another advantage of the invention in at least one form thereof is providing a fastener assembly for side curtain airbags that is robust and secure.

Still another advantage of the invention in at least one form thereof is providing a fastener assembly that provides both visual and physical verification of proper installation, and that can provide both visual and physical identification of fasteners for which the installation process has been verified.

A further advantage of the invention in at least one form thereof is providing an attachment system for side curtain airbags that alleviates the need for vehicle assemblers to manually handle bolts during assembly, and allows for simplified preparation by stamping or punching alone, rather than stamping or punching together with welding the vehicle frame in preparation to receive the fastener.

A still further advantage of the invention in at least one form thereof is providing a fastener requiring low insertion force yet high extraction force in an assembly.

Other features and advantages of the invention will become apparent to those skilled in the art upon review of the following detailed description, claims and drawings in which like numerals are used to designate like features.

BRIEF DESCRIPTION OF THE DRAWINGS

FIG. 10 is an enlarged fragmentary view of the fastener during an initial step in the assembly to an automobile;

FIG. 11 is an enlarged fragmentary view similar to that of FIG. 10, but illustrating a later step in the assembly process;

FIG. 12 is a cross-sectional view of a pin in one embodiment of the fastener;

FIG. 13 is a fragmentary perspective view of the fastener before final installation steps;

Figure 1:
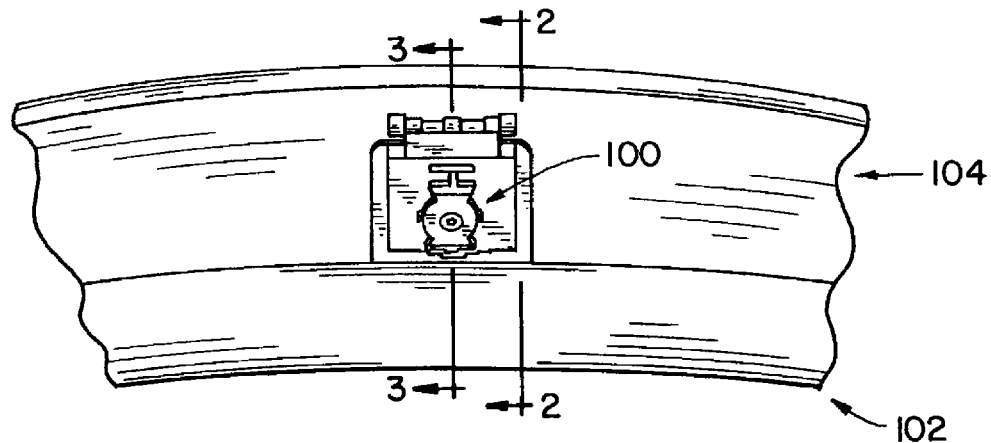
FIG. 1 is a fragmentary elevational view of an airbag fastener assembly in accordance with the present invention as part of a side curtain airbag assembly in an automobile.
Figure 2:
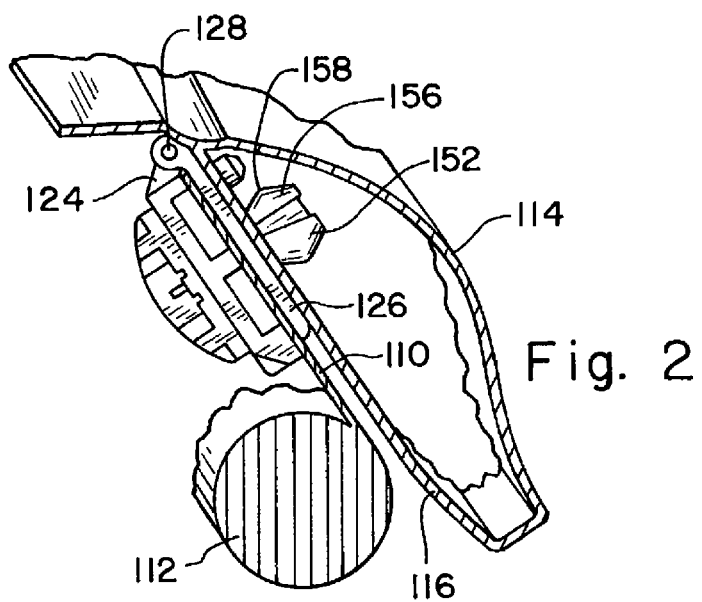
FIG. 2 is a cross-sectional view of the side curtain airbag assembly shown in FIG. 1, taken along line 2-2 of FIG. 1.
Figure 3:
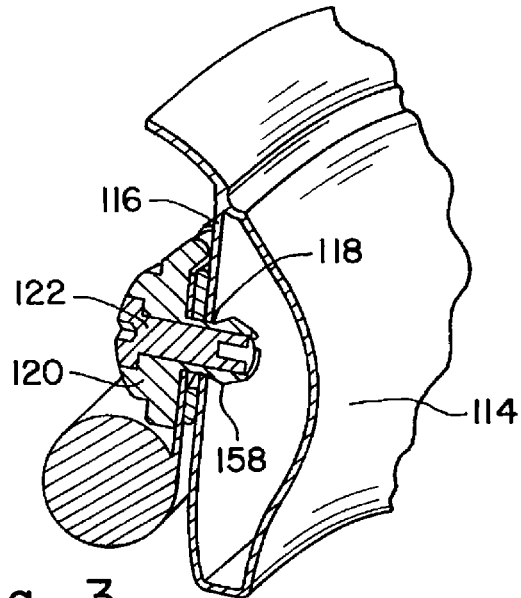
FIG. 3 is a cross-sectional view of the side curtain airbag assembly shown in FIG. 1, taken along line 3-3 of FIG. 1.
Figure 4:
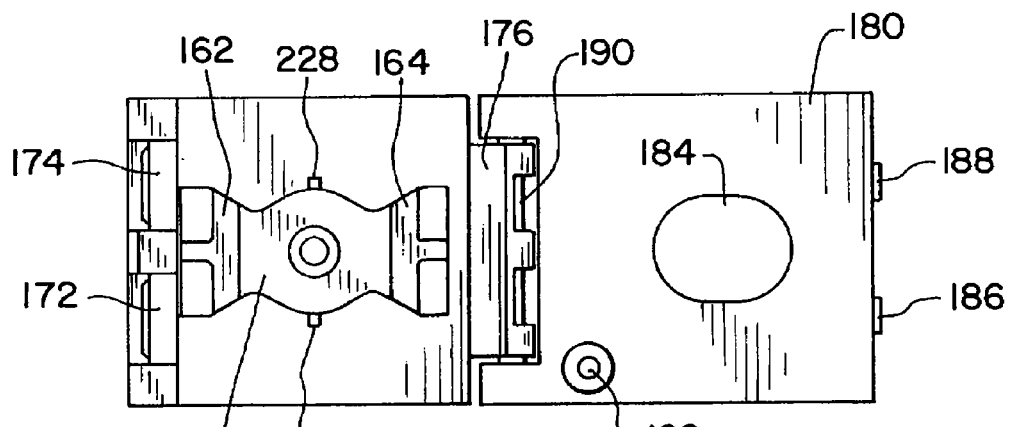
FIG. 4 is a top plan view of the fastener before attachment to a side curtain airbag assembly.
Figure 5:
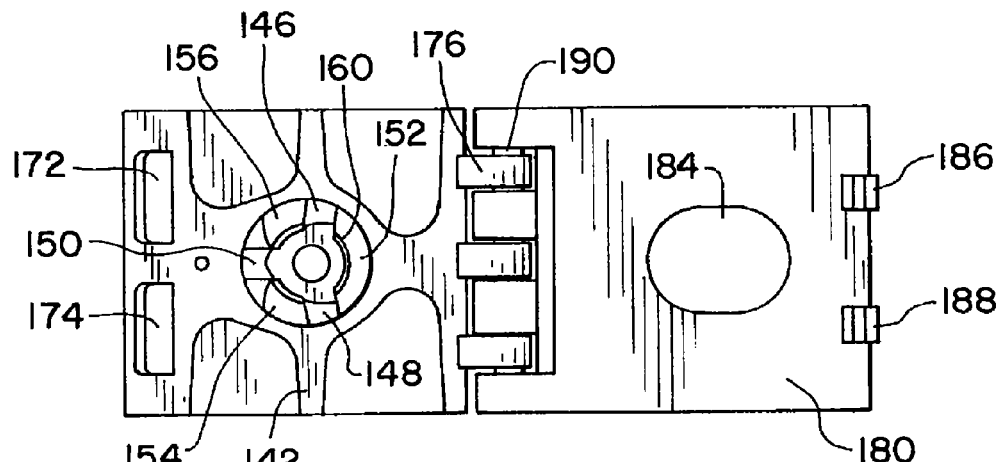
FIG. 5 is a plan view of the bottom of the fastener shown in FIG. 4.
Figure 6:
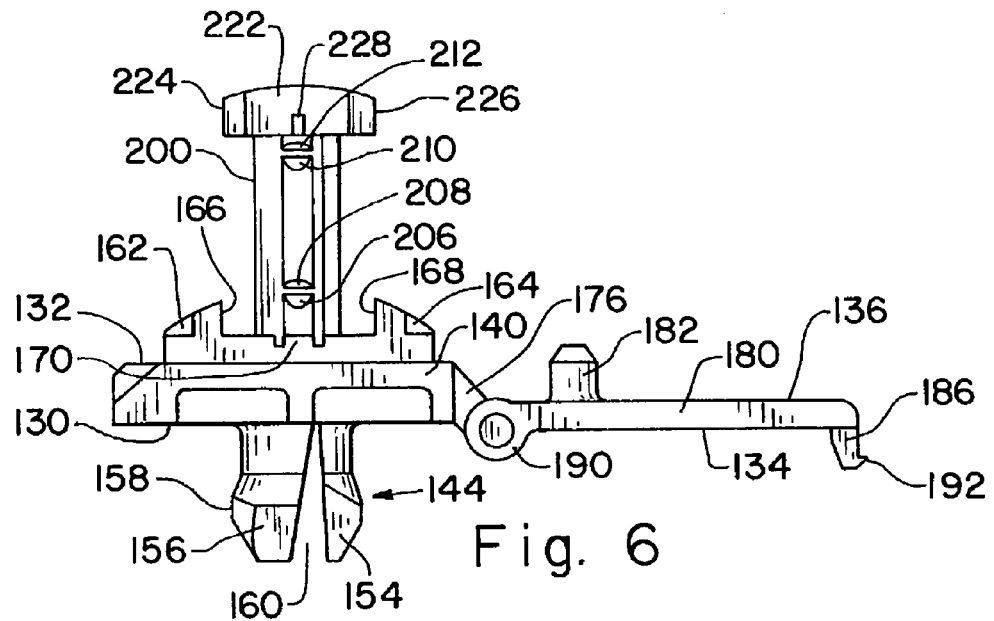
FIG. 6 is a side elevational view of the fastener shown in FIGS. 5 & 6.
Figure 7:
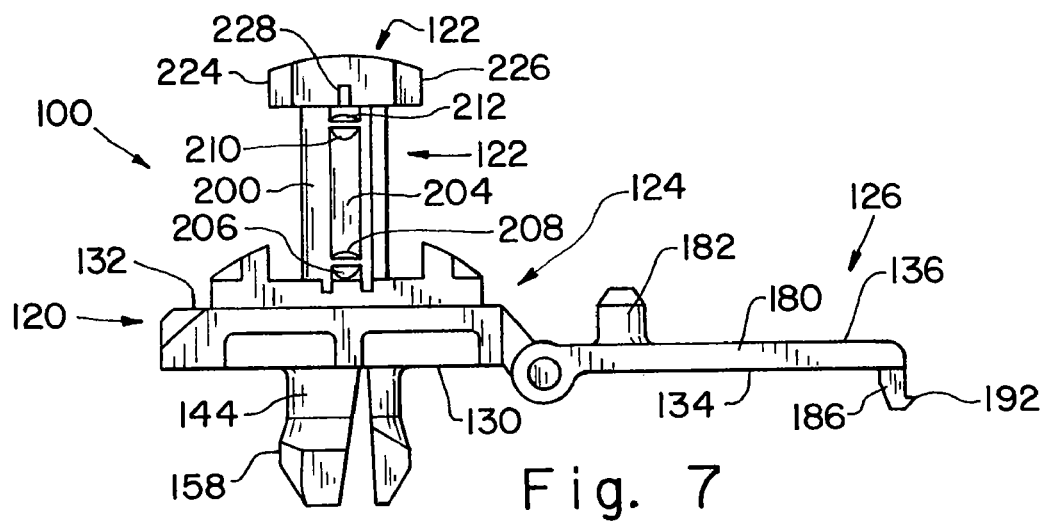
FIG. 7 is a side elevational view similar to that of FIG. 6, but illustrating the fastener in a different position of assembly
Figure 8:
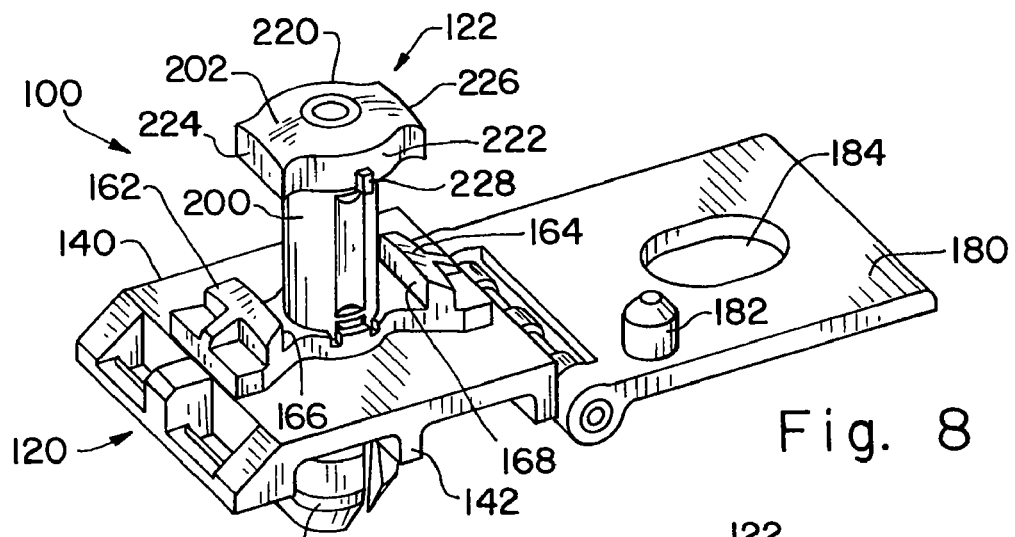
FIG. 8 is a perspective view of the fastener as shown in FIG. 7.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, a fastener assembly 100 is shown securing an airbag assembly 102 within a roof component 104 of a motor vehicle. Fastener assembly 100 to be described in greater detail hereinafter has particular advantages when used for fastening airbag assembly 102; however, it should be understood that a fastener assembly having features of the present invention can be used for other purposes as well.

Airbag assembly 102 includes a fastening tab 110 and an airbag 112. Those skilled in the art will readily understand that airbag 112, which is depicted herein as a generally elongated cylindrical body, may include an openable frame or holder, an inflatable bag, a trigger mechanism and the like. Airbag 112 can be of different constructions, and fastener assembly 100 can be used with different constructions. Accordingly, airbag 112 will not be described in further detail in that those skilled in the art will readily understand other structures and details included in the airbag assembly.

Roof component 104 includes an outer shell 114 and an inner structure 116 defining a hole 118 to which airbag assembly 102 is connected via fastener assembly 100. A stud receiving hole 119 (FIGS. 10 and 11) can be used for proper positioning of fastener assembly 100 relative to roof component 104. The configurations of roof component 104, including outer shell 114, inner structure 116 and holes 118, 119 are merely exemplary of suitable configurations, and still other constructions and arrangements can be used together with a fastener of the present invention.

Figure 9:
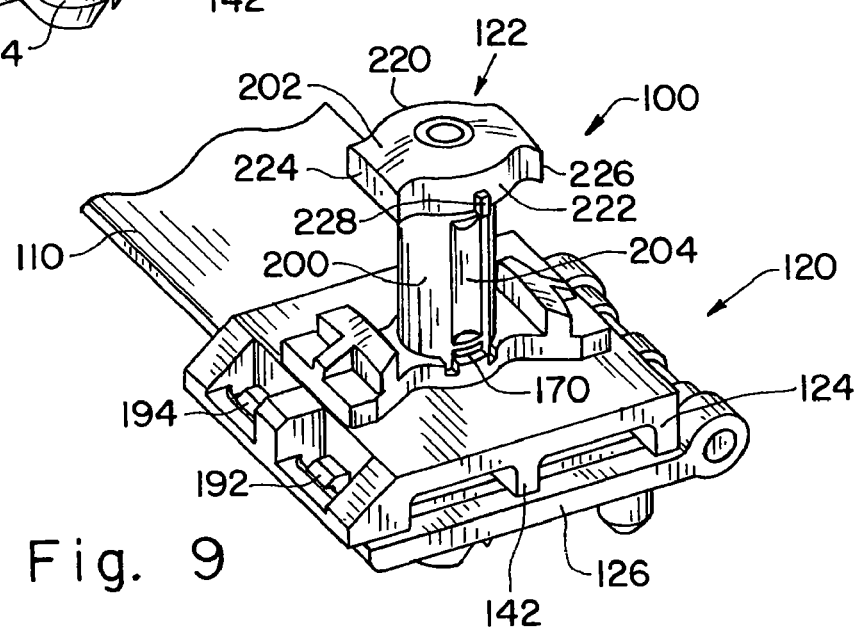
FIG. 9 is a perspective view of the fastener attached to an airbag assembly shown in fragmentary portion, with the fastener and airbag assembly generally in a condition for shipment to a site for installation in a vehicle.

Fastener assembly 100 includes a body 120 and a pin 122 received in body 120. Body 120 includes a first anchoring body component 124 and a second clamping body component 126 connected one to another by a hinge 128. Body 120 is configured for capturing and retaining fastening tab 110 of airbag assembly 102, and for being secured to inner structure 116 of roof component 104. First anchoring body component 124 and second clamping body component 126 are pivotal about hinge 128 toward one another to secure fastening tab 110 there between. Accordingly, first anchoring body component 124 has an inner face 130 and an outer face 132, and second clamping body component 126 has an inner face 134 and an outer face 136 each relative to a folded or closed position of body 120, as shown in FIG. 9.

First anchoring body component 124 is configured to be secured in a structure so as to fix or anchor the fastener in place which also cooperating with clamping body component 126 to hold an element, such as airbag assembly 102. In the exemplary embodiment, first anchoring body component 124 includes a panel 140 which may include reinforcing ribs 142. A flexible collet 144 extends away from inner face 130 and has one or more generally axially extending slit 146, 148, 150 therein to separate collet 144 into collet segments 152, 154, 156 that are flexibly movable under force. In the exemplary embodiment shown, three axially extending slits 146, 148, 150 are shown dividing collet 144 into three collet segments 152, 154, 156; however, it should be understood that more or fewer slits can be used to define more or fewer flexibly movable collet segments. Collet segments 152, 154, 156 are joined to inner face 130 at the proximal ends thereof. At the distal ends thereof, collet segments 152, 154, 156 are discrete one from another to provide flexibility. Outer surfaces of distal end regions of collet segments 152, 154, 156 are shaped to collectively define a waist 158 of greatest girth for collet 144, the surfaces tapering inwardly in each axial direction from waist 158. An opening 160 extends through collet 144 and panel 140 and is configured to receive pin 122 therein, as will be described in greater detail hereinafter. Pedestals 162, 164 project from outer face 132 near to, and on opposite sides of opening 160. Pedestals 162, 164 have confronting, spaced face surfaces 166, 168 that interact with pin 122 in a manner to be described subsequently herein. One or more positioning/orienting finger 170 is provided also for interacting with pin 122 in a manner to be described. Windows or apertures 172, 174 are provided along an edge of first panel 140 on the opposite side thereof from a first hinge component 176 forming a part of hinge 128.

Second clamping body component 126 can be held to first anchoring body component 124 with fastening tab 110 between the body components. In the exemplary embodiment, second clamping body component 126 includes a second panel 180 and a locating stud 182 projecting from outer face 136 of panel 180. Locating stud 182 further provides a second anchoring point resisting rotation of the fastener during testing to be described subsequently herein. An elongated slot 184 is defined through second panel 180. Fastening legs 186, 188 are provided along the outer edge of panel 180, generally opposite to a second hinge component 190 forming a part of hinge 128 together with first hinge component 176 of first panel 140. Angular locking tips 192, 194 are provided on distal ends of fastening legs 186, 188 for securing legs 186, 188 in apertures 172, 174 and thereby holding second clamping body component 126 to first anchoring body component 124.

Pin 122 includes an elongated shaft 200 and a head 202 at one end of shaft 200. Shaft 200 is configured to be received through opening 160 and collet 144. Shaft 200 may include one or more channel 204 for sliding engagement with orienting finger 170 of body 120. Accordingly, pin 122 is rotationally positioned correctly relative to body 120 by orienting finger 170 being received in channel 204 so that shaft 200 is received through opening 160. One or more protuberance 206, 208, 210, 212 can be provided in channel 204 for interacting with finger 170 to retain pin 122 in body 120 during initial shipment of fastener assembly 100, pre-assembly with fastening tab 110 and subsequent shipment and final assembly in a vehicle.

Head 202 is generally elongated and includes curved sides 220, 222 and flattened ends 224, 226. The length of head 202 between flattened ends 224, 226 corresponds to the space between face surfaces 166, 168 of pedestals 162, 164. Accordingly, when pin 122 is fully inserted relative to body 120, flattened ends 224, 226 of head 202 confront face surfaces 166, 168 of pedestals 162, 164, and may be in physical contact therewith or in close proximity thereto. A knob or knobs 228 extends outwardly from one or both curved sides 220, 222. Knob 228 has a first physical relationship to head 202 unless and until a minimum specified torque is applied to head 202.

Body 120 and pin 122 can be formed from suitable plastics by known molding techniques. Body 122, including first anchoring body component 124, second clamping body component 126 and hinge 128 can be cast as a single structure. For initial shipment and a subsequent preassembly, pin 122 can be partially inserted into body 120, with finger 170 engaging channel 204 between two protuberances 206, 208. In this position, pin 122 is retained in body 120 during normal handling.

Fastening tab 110 of airbag assembly 102 is provided with necessary holes or apertures for securement between inner faces 130, 134 of body components 124, 126. Accordingly, flexible collet 144 can be passed through one such opening in fastening tab 110. Clamping body component 126 is folded toward and against fastening tab 110 by passing slot 184 over collet 144 and passing legs 186, 188 through additional holes in the fastening tab, if the fastening tab is of a width to span the area between legs 186, 188. Alternatively, legs 186, 188 and apertures 172, 174 can be provided outwardly of the side edges of fastening tab 110. With fastening tab 110 sandwiched between inner face 130 and inner face 134, legs 186, 188 are inserted through apertures 172, 174. The legs can deflect slightly as necessary to pass locking tips 192, 194 through apertures 172, 174 and to rebound again outwardly to secure an interlocking structure of the legs within the apertures. In an advantageous embodiment, waist 158 has a girth larger than the minor diameter of slot 184 so that collet segments 152, 154, 156 engage the edge of the slot and deflect inwardly as collet 144 passes through slot 184. After waist 158 has passed completely through slot 184, so that collet segments 152, 154, 156 rebound outwardly, second clamping body component 126 is held against first anchoring body component 124 even without the added security of legs 186, 188 being engaged with apertures 172, 174. Fastener 100 is thus preassembled onto airbag assembly 102 for transportation to and final assembly at a motor vehicle assembly plant.

For final assembly and installation, flexible collet 144 is inserted through hole 118 and locating stud 182 is placed in stud receiving hole 119. Pin 122 remains in a retracted position, allowing collet segments 152, 154, 156 to deflect inwardly as waist 158 passes through hole 118. With collet 144 fully inserted through structure 116, collet segments 152, 154, 156 rebound outwardly, with waist 158 defining a girth larger then the diameter of hole 118 (FIG. 10). Accordingly, body 120 is secured to roof component 104. To prevent unintended dislodgment of collet 144 from hole 118, pin 122 is driven inwardly so that shaft 200 is disposed within opening 160 of collet 144. Shaft 200 prevents inward deflection of collet segments 152, 154, 156, thereby preventing waist 158 from being squeezed inwardly sufficiently to be withdrawn through hole 118 (FIG. 11).

Figure 14:
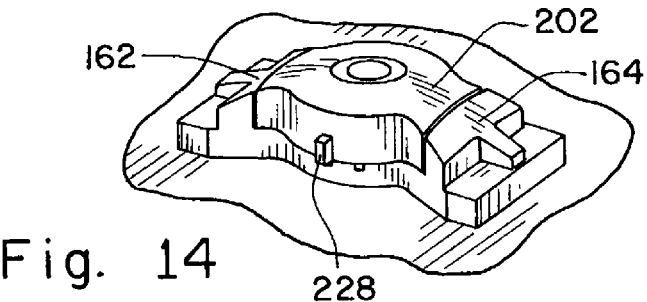
FIG. 14 is a fragmentary view similar to that of FIG. 13, but illustrating final installation prior to installation verification.

With pin 122 fully inserted in body 120, head 202 is positioned between pedestals 162, 164 and flattened ends 224, 226 of head 222 are disposed against or in close proximity to face surfaces 166, 168 of pedestals 162, 164 (FIG. 14). Accordingly, pin 122 is not rotatable at non-excessive torque. If pin 122 is not fully inserted, so that head 202 is axially outwardly positioned from pedestals 162, 164, less resistance to rotation of pin 122 is present. Accordingly, by ensuring that pin 122 resists rotation under a determined torque it can be verified that pin 122 has been fully inserted, with head 202 positioned between pedestals 162, 164 as described above. Torque measurements can be taken by manually operated tools or by automatic data acquiring apparatus for measuring torque. A tool used to engage and attempt to turn pin 122 can shear or otherwise damage, alter or deform knob 228, indicating that verification of proper installation has been performed on fastener assembly 100. Stud 182 in hole 119 resists unintended turning of fastener body 120 when torque is applied to pin 122. An appropriate tool can be configured so that the tool is operable in applying torque to head 202 at or below a specified torque and in operable against head 202 above a specified torque due to the alteration or removal of knob 228.

Features of the present invention can be achieved with fastening structures of other configurations. For example, FIG. 12 illustrates in cross-section a fastener assembly 240 having a body 242 and a pin 244. Shallow channels 246, 248 are provided on opposite sides of pin 244. Curved locators 250, 252 engage channels 246, 248 to orient pin 244 relative to body 242. A head (not shown) for pin 244 fits between pedestals 254, 256 similarly to that described previously herein.

Figure 15:
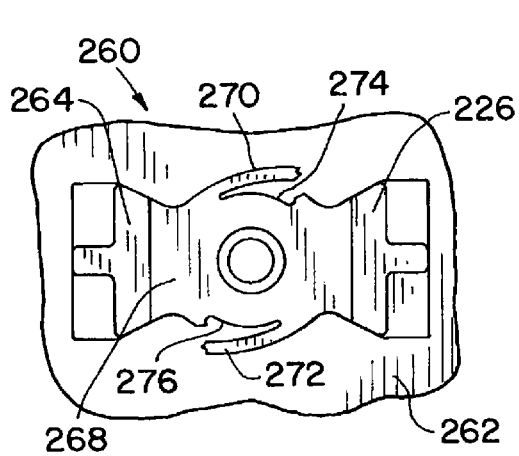
FIG. 15 is a top plan view of another embodiment of the fastener.
Figure 16:
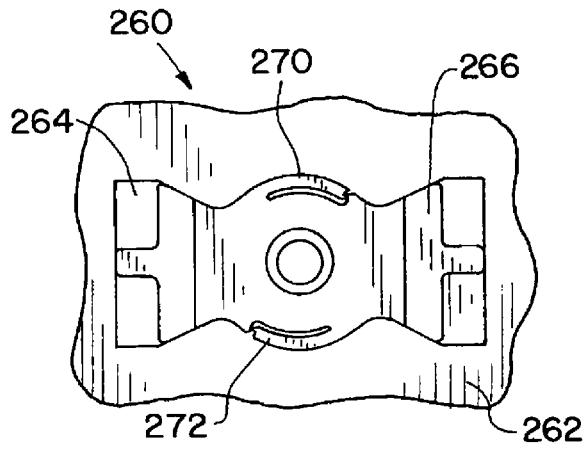
FIG. 16 is a top plan view of the fastener shown in FIG. 15, but illustrating the fastener after verification testing.

FIGS. 15 & 16 illustrate a further embodiment in which a fastener assembly 260 includes a body 262 having pedestals 264, 266. A pin head 268 is received between pedestals 264, 266 as described for previous embodiments. Wings 270, 272 angle outwardly from curved sides 274, 276 of head 268. Head 268 is received between pedestals 264, 266 similar to pedestals 162, 164 described previously herein. A tool for verifying proper installation of fastener assembly 260 operates against wings 270, 272 by exerting rotational force there against. Wings 270, 272 can be provided of sufficient size and stiffness so that greater force is required for the de-formation of wings 270, 272 than for rotating the pin with head 268 outwardly of its final position between pedestals 264, 266. A torque reading sufficient to crush or de-form wings 270, 272 (FIG. 16) indicates proper positioning of head 268 between pedestals 264, 266. An insufficient torque measured in conjunction with rotation of pin head 268 indicates improper installation of fastener assembly 260, with head 268 outwardly all of pedestals 264, 266. An insufficient torque measured without rotation of head 268, generally a torque also insufficient for rotating head 268 in a retracted position, indicates that wings 270, 272 have been crushed, deformed or otherwise altered due to previous testing of fastener assembly 260. The position of wings 270, 272 also provides a visual indication of whether or not verification of proper installation has been performed on fastener assembly 260.

Figure 17:
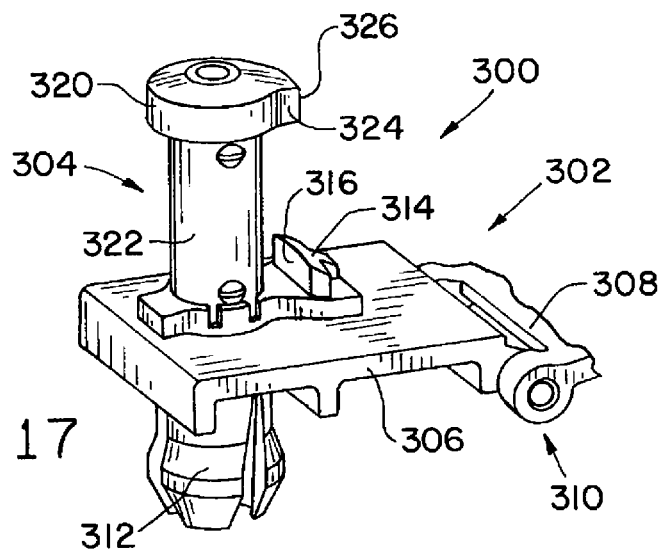
FIG. 17 is a fragmentary perspective view of yet another embodiment of a fastener of the present invention.

FIG. 17 illustrates a fastener assembly 300 including a body 302 and a pin 304. Body 302 includes a first anchoring body component 306 and a second clamping body component 308 connected by hinge 310. First anchoring body component 306 includes a collet 312 and a single pedestal 314 with a face surface 316. Pin 302 includes a generally rounded head 320 and a shaft 322. Head 320 defines a single lobe 324 having a flattened end 326 for engagement against face surface 316. Legs are not provided for connecting first anchoring body component 306 to second clamping body component 308; however, in the final assembly, second clamping body component 308 is sandwiched between the roof inner structure component and first anchoring body component 306. It should be understood that fastener assembly 300 can be used also with legs as described previously; and previous embodiments described herein can be used also without the legs described therefore. With collets extending through the clamping body components, and the clamping body components thus sandwiched between the anchoring body components and the inner structure of the roof, fasteners will remain in the proper assembled condition.

Figure 18:
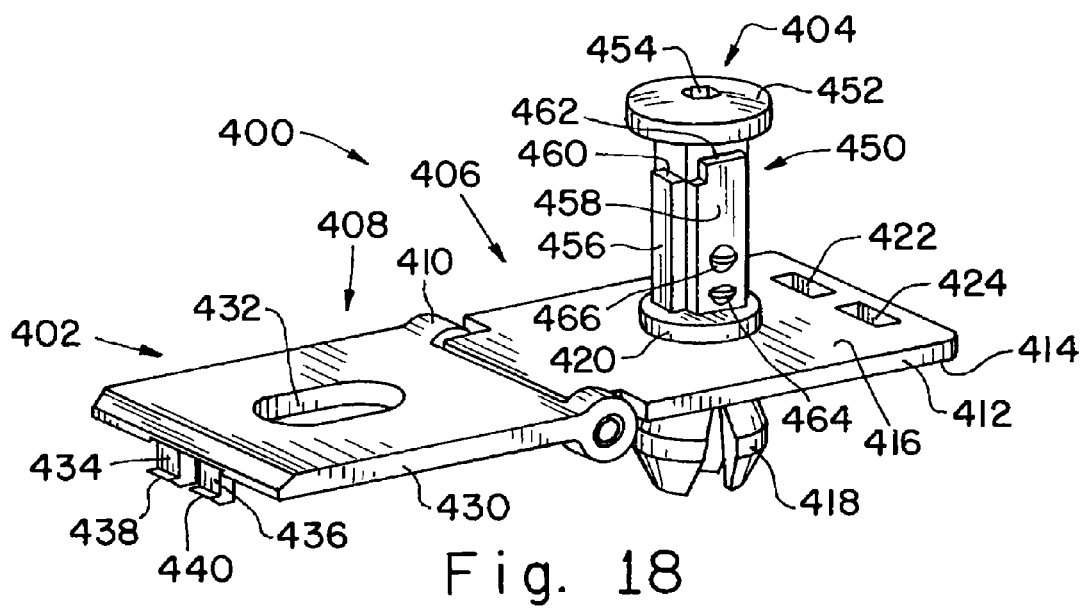
FIG. 18 is a perspective view of yet another embodiment for a fastener of the present invention.

FIG. 18 illustrates yet another embodiment of the present invention. Fastener assembly 400 includes a body 402 and a pin 404. Body 402 includes a first anchoring body component 406 and a second clamping body component 408 rotatably connected one to another by a hinge 410. First anchoring body component 406 includes a first panel 412 having an inner face 414 and an outer face 416. A flexible collet 418 projects a way from inner face 414. A collar 420 is disposed on outer face 416. Apertures 422, 424 are provided near an edge of first panel 412. Second clamping body component 408 includes a second panel 430 having a slot 432 provided there through to receive flexible collet 418 therein as described for previous embodiments. Second clamping body component 408 further includes legs 434, 436 having locking tips 438, 440 thereon for interacting with apertures 422, 424 as described for previous embodiments. The operation of body 402 to receive and secure a fastening tab of an airbag assembly, and to close and interlock the body components together is similar to that described previously herein for other embodiments.

Pin 404 includes a contoured shaft 450 and a head 452. Head 452 can be provided with a drive tool recess 454 to receive a drive tool there in for rotating pin 404. Contoured shaft 450 includes side lobes 456, 458 to be received in complementary channels defined in collar 420. While two lobes 456, 458 can be seen in the exemplary embodiment, it should be understood that more or fewer lobes also can be provided. Lobes 456, 458 terminate a spaced distance from head 452 and define constricting ramps 460, 462 at the tops thereof. Collar 420 is configured together with the configuration of pin 404 such that with pin 404 fully inserted, and with head 452 resting against collar 420, pin 404 can be rotated slightly so that structures of collar 420 wedge between the underside of head 452 and constricting ramps 460, 462. Verification of proper installation again can be determined from torque readings obtained through attempted rotation of pin 404. The configuration of contoured shaft 450 together with collar 420 requires greater torque for rotating pin 404 before pin 404 is fully inserted, allowing some rotation of pin 404 at lower torque only when constricting ramps 460, 462 are positioned within collar 420. However, the configuration of constricting ramps 460, 462 allow for only partial rotation of pin 404, locking the pin and position. Protuberances 464, 466 can be provided on pin shaft 450 for interacting with collar 420 to retain a preassembly position of pin 404 in body 402, as described for previous embodiments herein.

Figure 19:
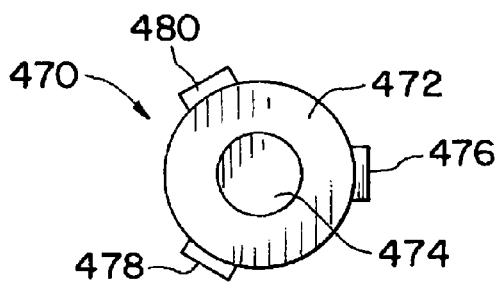
FIG. 19 is an end view of another embodiment of a pin for a fastener of the present invention.

FIG. 19 illustrates a further embodiment for a pin 470 of a fastener of the present invention. In 470 includes a head 472 having a recess 474 there in, which may be a simple tool locating recess. A plurality of sheer tabs 476, 478, 480 is provided at the periphery of head 472. A tool for rotating pin 470 can include legs engaging sheer tabs 476, 478, 480; and initial rotation of the pin can be from engagement of the tool against the sheer tabs or operation of the tool against head 472. Upon the pin reaching a locked position, in which further rotation is obstructed, sheer tabs 476, 478, 480 can be separated from head 472 by rotation of the tool, or can be otherwise altered to eliminate engagement against the tool. Thereafter, pin 470 cannot be further rotated. With the sheer tabs removed or altered, a suitable tool will no longer engage the head. Accordingly, after torque readings have been obtained for initial rotation of the pin, and the sheer tabs have been removed thereafter, no further torque readings can be obtained in that the tool will no longer engage the pin for attempted rotation. While the exemplary embodiment shows the use of three sheer tabs 476, 478, 480 it should be understood that more or fewer tabs can be used.

Figure 20:
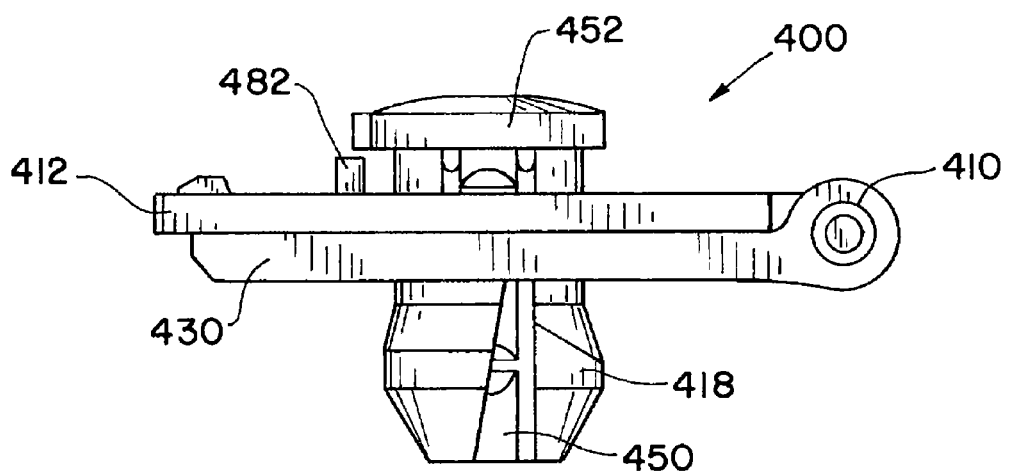
FIG. 20 is a side view of a fastener of the present invention.

FIG. 20 illustrates an embodiment similar to that of FIG. 18, and the similar components of the fastener shown in FIG. 20 have the same reference numerals as used in FIG. 18. However, one or more sheer tab 482 is provided on outer surface 416 of the first panel 412. A tool operable to turn pin 402 so as to lock collar 420 together with constricting ramps 460, 462 also operates against sheer tab 482 to sheer the tab upon the necessary quarter turn. Removal or alteration of the sheer tab indicates that an installation verification test has been performed. It should be understood that a sheer tab 482 can be used in a fastener body of a fastener assembly also having a pin and therein such as pin 470 described in FIG. 19. While a single sheer tab 482 has been shown in the exemplary embodiment, it should be understood that more or fewer sheer tabs can be used.

Figure 21:
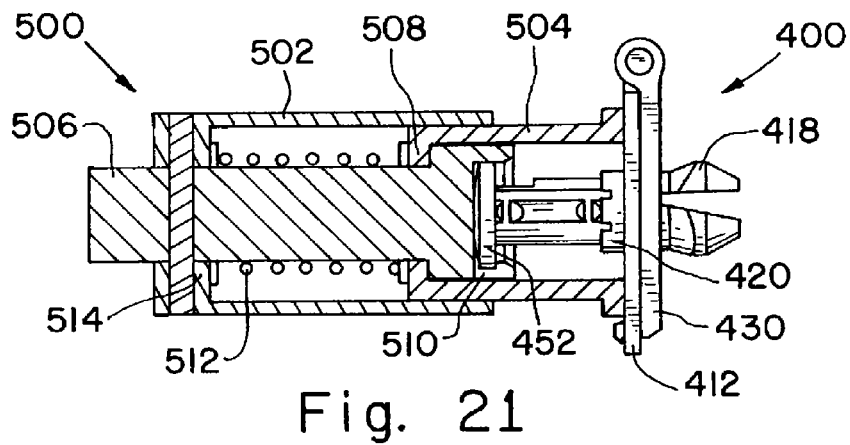
FIG. 21 is a cross-sectional view of a fastener of the present invention together with a tool for verifying proper installation.
Figure 22:
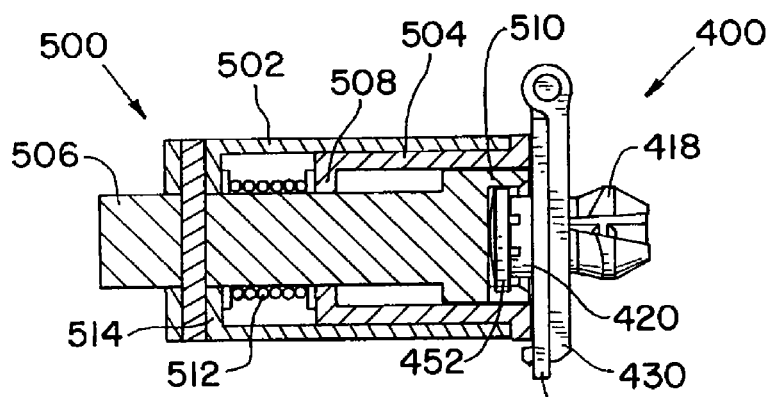
FIG. 22 is a cross-sectional view similar to that of FIG. 21, but illustrating the tool at a subsequent step of the verification process.

FIGS. 21 and 22 illustrate an exemplary tool 500 for use with a fastener assembly such as fastener assembly 400. Tool 500 can be used to install a pin of a fastener assembly, and thereafter to provide a torque measurement for traceability of proper installation. Tool 500 includes an outer sleeve 502 and an inner sleeve 504 telescopically received in outer sleeve 502. Inner sleeve 504 can include locating pins (not shown) received in holes of fastener assembly 400 whereby inner sleeve 504 will not rotate relative to fastener 400. A drive shaft 506 is slidingly received in an end plate 508 of inner sleeve 504. A drive head 510 at the end of driveshaft 506 is configured to engage head 452 of fastener assembly 400. A spring 512 operably disposed between end plate 508 and an outer plate 514 all of outer sleeve 502. Accordingly, tool 500 is biased to the position shown in FIG. 21. Drive head 510 can include a hex drive configuration to be received in drive tool recess 454 or can be configured to engage driving sheer tabs 478, 480, 482 of pin 470. Shaft 506 is moving axially to advance pin 404 into body 402 until properly seated. Structural relationships between shaft 506 and end plate 508 can include pin and channel arrangements whereby shaft 506 can not be rotated until fully advanced as shown in FIG. 22. When so configured, the pin will not be rotated until fully installed. Torque measurements taken by rotation of shaft 506 can be used to determine proper installation and to restrict installation verification to one occurrence by removal of the sheer tabs as explained previously here in.

Figure 23:
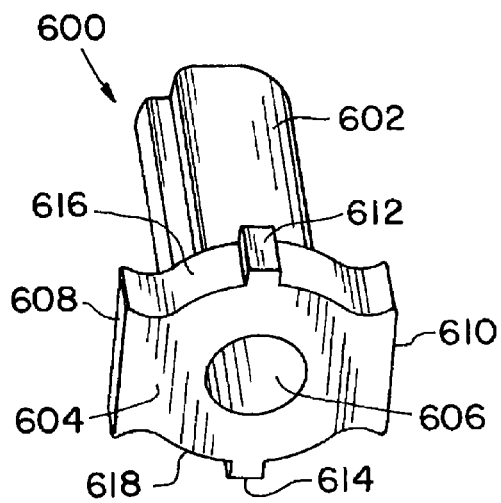
FIG. 23 is a perspective view of another pin for a fastener of the present invention.

FIG. 23 illustrates yet another pin 600 of the present invention having a shaft 602 and a head 604 at the end thereof. A drive tool locating recess 606 is provided in head 604. Head 604 further includes flattened ends 608, 610. Combination drive/sheer tab extensions 612, 614 are provided on curved sides 616, 618 of head 604. Head to 604 is thereby configured for engaging pedestals of the fastener bodies described previously herein or of a fastener body 620 to be described subsequently herein, and for operating together with a suitable tool for engaging and rotating the pin via combination drive/sheer tab extensions 612, 614. As described previously here in the tabs can be removed, deformed or otherwise altered by operation of the tool upon completion of verification testing.

Figure 24:
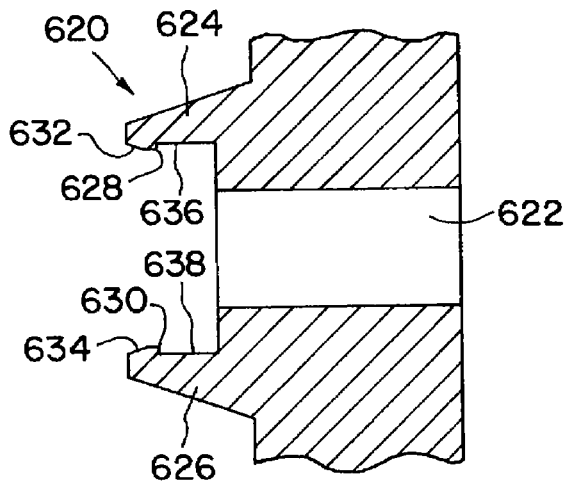
FIG. 24 is a cross-sectional view of another part of a fastener of the present invention.
Figure 25:
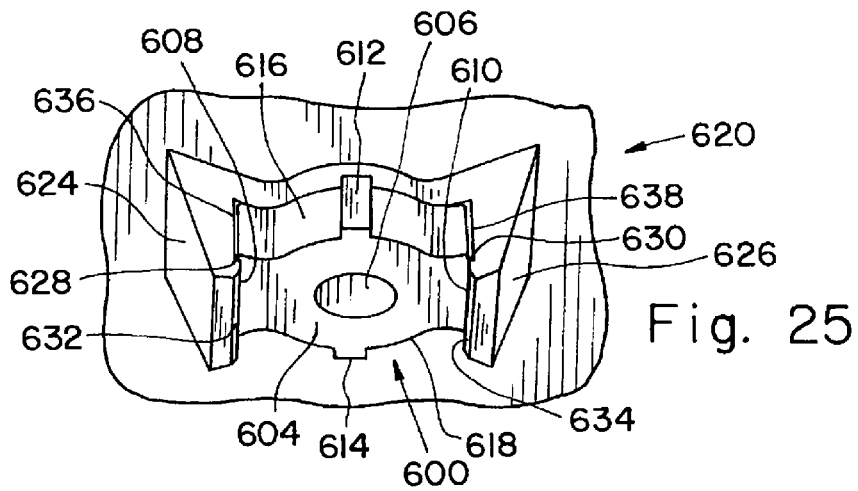
FIG. 25 is a perspective view of yet another embodiment of the present invention.
Figure 26:
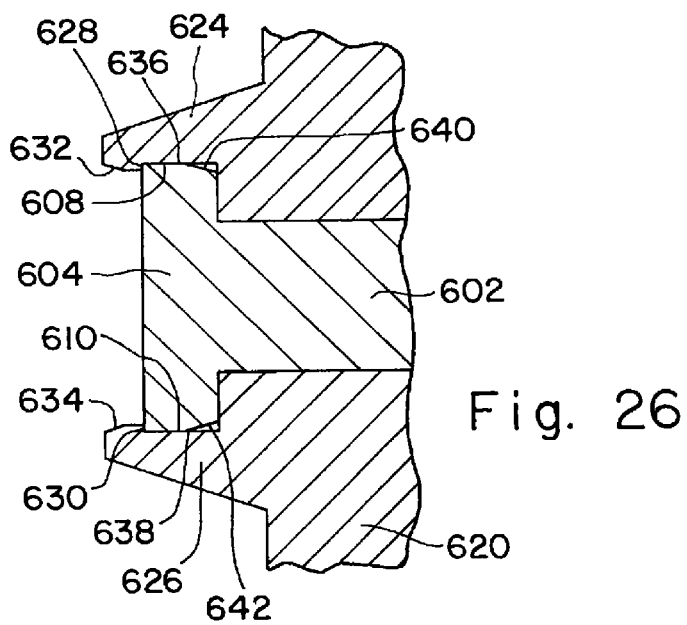
FIG. 26 is a fragmentary cross-sectional view of yet another embodiment of a fastener of the present invention.

FIG. 24 illustrates a further embodiment of a fastener body 620 having an opening 622 there through. Pedestals of 624, 626 are provided for engaging the head of a pin of the fastener, such as pin 600 described previously. Pedestals 624, 626 include inwardly extending ledges 628, 630, respectively, and angular lead-in surfaces 632, 634 leading thereto. Face surfaces 636, 638 on pedestals 624, 626 engage a head of a pin, as described previously. As shown in FIGS. 25 & 26, head 604 is received between pedestals 624, 626 by outward deflection of the pedestals upon axial advancement of pin 600. With head 604 in a final position, pedestals 624, 626 rebound to their non-deflected positions, and ledges 628, 630 overlap head 604. Accordingly, pin 600 is locked in its final position, and axial retraction or pin withdrawal is inhibited.

Chamfered surfaces 640, 642 (FIG. 26) can be provided on head 604 to facilitate the insertion of pin 600 into fastener body 620. Chamfered surfaces 640, 642 encounter lead-in surfaces 632, 634 as pin 600 is advanced. The angular engaging relationship between lead-in surfaces 632, 634 and chamfered surfaces 640, 642 facilitates proper alignment and advancement of pin 600 by aligning the engaging surfaces and deflecting pedestals 624, 626 sufficiently for head 604 to advance past ledges 628, 630.

Figure 27:
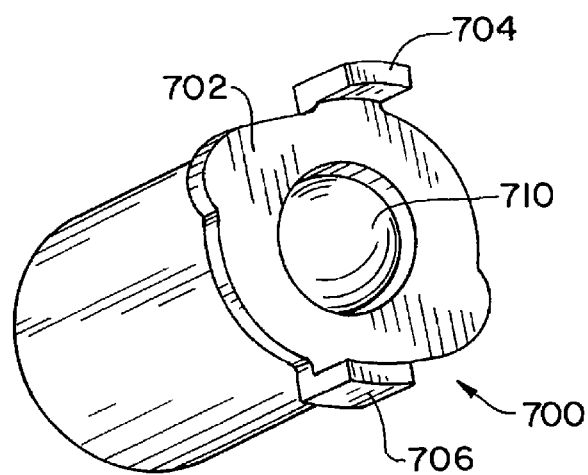
FIG. 27 is a perspective view of another tool for verifying proper installation of fasteners of the present invention.
Figure 28:
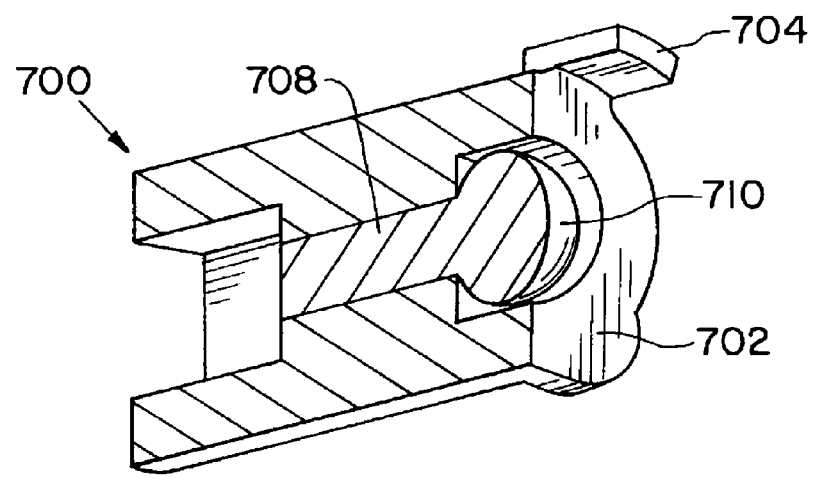
FIG. 28 is a cross-sectional view of the tool shown in FIG. 27.
Figure 29:
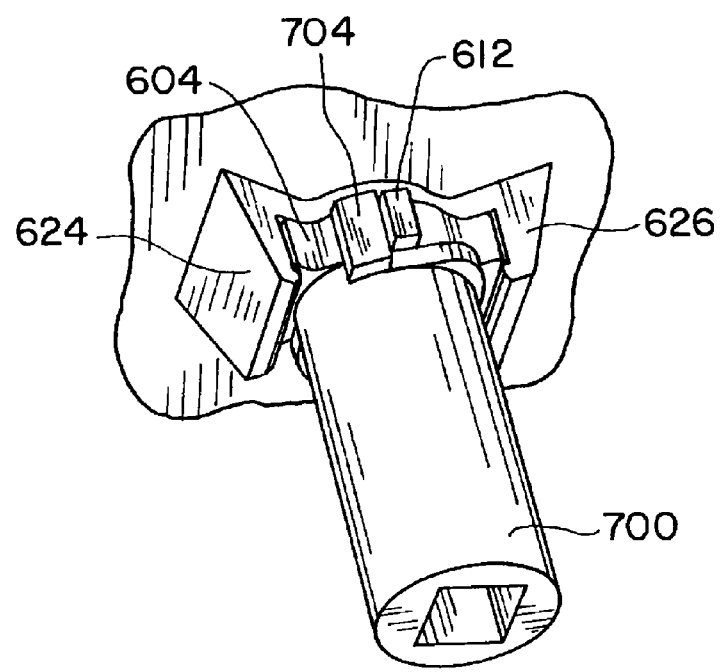
FIG. 29 is a fragmentary perspective view of a fastener of the present invention with the tool shown in FIGS. 27 and 28 positioned thereon for verification of proper fastener installation.

FIGS. 27-29 illustrate a suitable tool 700 for operating together with pin 600 and body 620. Tool 700 includes a head 702 and drive arms 704, 706 for engaging combination drive/sheer tab extensions 612, 614. A locator 708 includes a ball end 710 received in drive tool locating recess 606. Accordingly, tool 700 is properly aligned with pin 600, and drive arms 704, 706 engage the combination drive/sheer tab extensions 612, 614 to first rotate the pin and obtain torque readings for installation verification, and thereafter to deform or separate the tabs from the head, to prevent subsequent retesting of the fastener. FIG. 29 illustrates tool 700 in position on head to 600, which is installed in body 620.

The tools shown and described herein can be provided with suitable ergonomic handles for manual operation and manual recordation of torque data acquired therefrom. The tools also are suitable for operation by automated means, including automated data recording means.

It should be understood that still other variations and modifications can be made while taking advantage of the features of the present invention. For example, while the various clamping body components have been shown and described as being sandwiched between the anchoring body component and the structure to which the fastener assembly is attached, the general relationships of the body components can be reversed. For example, the anchoring body component can be attached to the structure directly, between the clamping body component and the structure. The clamping body component can then be locked or otherwise engaged with the anchoring body component to secure an element being held by the fastener, the element being held between the anchoring body component and the clamping body component. Still further variations can be used, such as a pin having a head larger than a hole in the clamping body component, with the pin extending through the clamping body component and secured in the anchoring body component.

While an expandable collet and pin have been shown for holding the fastener assembly to a structure, other anchoring structures also can be used, with or without the various breakaway features for indicating installation verification testing. For example, a clip or fastener can include a threaded or semi-threaded rotatable component having breakaway or deformable sheer tabs thereon to operate in a manner similar to knobs 228; sheer tabs 476, 478, 480; sheer tab extensions 612, 614; or the like. Breakaway or deformable sheer tabs also can be used on threaded fasteners or other anchoring components having rotatable elements associated with anchoring the fastener, including various retention and guide clips requiring installation verification testing, with the tabs engaged by a tool for verifying proper installation and anchoring of the fastener by rotating the rotatable element.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An airbag fastener assembly, comprising:
    a body having first and second body components holdable one against another, via a hinge, for capturing a portion of an airbag assembly therebetween;
    a collet affixed to one of said body components and extendable through the other of said body components when said body components are folded together;
    means for securing said collet to a vehicle;
    wherein a pin is inserted into said collet;
    said pin being configured to rotate within said collet upon application of a torque, and
    wherein a torque required to rotate said pin is greater when said pin is fully inserted into said collet in comparison to when said pin is not fully inserted into said collet.

2. The airbag fastener assembly of claim 1, said collet extending from an inner face of one of said body components through a slot in the other of said body components.

3. The airbag fastener assembly of claim 1, including interlocking structure between said first and second body components.

4. The airbag fastener assembly of claim 3, said interlocking structure including legs on one of said body components engaging apertures in the other of said body components.

5. The airbag fastener assembly of claim 1, said collet including deflectable collet segments for insertion through a hole in the vehicle.

6. The airbag fastener assembly of claim 5, wherein said pin in said collet inhibits inward deflection of said collet segments.

7. The airbag fastener assembly of claim 6, said body defining a face surface and said pin defining a flattened surface for confronting said face surface with said pin inserted in said collet.

8. The airbag fastener assembly of claim 6, said one of said body components defining spaced pedestals having face surfaces thereon and said pin having a head and flattened ends on said head, said head disposed between said pedestals and said flattened ends confronting said face surfaces.

9. The airbag fastener assembly of claim 6, said collet segments having a waist of greatest girth and inwardly angled surfaces of said collet segments extending axially from said waist.

10. An airbag assembly installation in an automobile having a roof component with a hole, said airbag assembly installation comprising:
    an airbag assembly including a fastening tab and an airbag connected to said fastening tab; and
    a fastener assembly securing said airbag assembly to the automobile roof component, said fastener assembly including:
    a body having first and second body components holdable one against another, via a hinge, with said fastening tab therebetween;
    a collet affixed to one of said body components and extendable through the other of said body components when said body components are held one against another;
    said collet extending into the hole of the roof component; and said collet being secured in the hole of the roof component;
    wherein a pin is inserted into said collet;
    said pin being configured to rotate within said collet upon application of a torque, and
    wherein a torque required to rotate said pin is greater when said pin is fully inserted into said collet in comparison to when said pin is not fully inserted into said collet.

11. The airbag assembly installation of claim 10, said collet extending from an inner face of one of said body components through a slot in the other of said body components.

12. The airbag assembly installation of claim 11, including legs on one of said body components engaging apertures in the other of said body components.

13. The airbag assembly installation of claim 10, said collet including collet segments deflectable for the hole in the vehicle roof component.

14. The airbag assembly installation of claim 13, wherein said pin in said collet inhibits inward deflection of said collet segments.

15. The airbag assembly installation of claim 14, said body defining a face surface and said pin defining a flattened surface for confronting said face surface with said pin inserted in said collet.

16. The airbag assembly installation of claim 14, said pin having a head including deformable segments yielding to installation application testing equipment.

17. The airbag assembly installation of claim 14, said body having spaced pedestals with face surfaces, and said pin having a head with flattened end surfaces confronting said face surfaces.

18. The airbag assembly installation of claim 17, said pedestals having ledges overlapping portions of said head.

19. The airbag assembly installation of claim 17, said pin head having deformable tool engaging extensions extending therefrom.

20. A fastener assembly, comprising:
    a body having first and second body components connected via a hinge that allows said first and second components to be foldable one against another for capturing therebetween an article to be held by said fastener assembly;
    a flexible collet including a plurality of collet segments affixed to one of said body components and extendable through the other of said body components when said body components are folded together;
    said collet having a waist of greatest girth and progressively narrow portions extend on either side of said waist; and
    a pin inserted into said collet to inhibit inward flexing of said collet segments;
    said pin configured to rotate within said collet upon application of a torque,
    wherein a torque required to rotate said pin is greater when said pin is fully inserted into said collet in comparison to when said pin is not fully inserted into said collet; and
    means for securing said collet to a vehicle.

21. The fastener assembly of claim 20, said pin including a head and said body including a protrusion engaging said head to inhibit rotation of said pin.

22. The fastener assembly of claim 20, said body including first and second spaced protrusions, and said pin including a head held between said protrusions.

23. The fastener assembly of claim 20, said pin including a head and features extending outwardly of said head for engaging a tool for verifying installation correctness, said features being modifiable by said tool during said testing to indicate completion of testing on the fastener.

24. A fastener assembly, comprising:
   a body having first and second body components holdable one against another thereof for capturing an article to be held by said fastener assembly;
   an anchoring structure connected to one of said body components and extendable through the other of said body components when said body components are held together;
   a rotatable element associated with operation of said anchoring structure, said rotatable element configured to be inserted into said anchoring structure; and
   a feature on said rotatable element, said feature having a structural relationship to said rotatable element that is altered upon rotation of said rotatable element at a torque greater than a specified torque,
   wherein said body includes a hinge connecting said first and second body components to one another;
   wherein a torque required to rotate said rotatable element is greater when said rotatable element is fully inserted into said anchoring structure in comparison to when said rotatable element is not fully inserted into said anchoring structure; and
   means for securing said anchoring structure to a vehicle.

25. The fastener assembly of claim 24, said feature being deformed upon rotation of said rotatable element at a torque greater than said specified torque.

26. The fastener assembly of claim 24, said feature being sheared from said rotatable element upon rotation of said rotatable element at a torque greater than said specified torque.

27. The fastener assembly of claim 24, including a tool for applying torque to said rotatable element, said tool being operable against said feature before said feature is altered, and said tool being inoperable against said feature after said feature is altered.

28. The fastener assembly of claim 24, including a tool for applying torque to said rotatable element, said tool being operable against said rotatable element before said feature is altered, and said tool being inoperable against said rotatable element after said feature is altered.

* * * * *